US009483426B2

(12) United States Patent
Ziarnik et al.

(10) Patent No.: US 9,483,426 B2
(45) Date of Patent: Nov. 1, 2016

(54) LOCKING A SYSTEM MANAGEMENT INTERRUPT (SMI) ENABLE REGISTER OF A CHIPSET

(75) Inventors: Gregory P. Ziarnik, Houston, TX (US); Michael R. Durham, Tomball, TX (US); Mark A. Piwonka, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 14/364,706

(22) PCT Filed: Jan. 31, 2012

(86) PCT No.: PCT/US2012/023225
§ 371 (c)(1),
(2), (4) Date: Jun. 12, 2014

(87) PCT Pub. No.: WO2013/115781
PCT Pub. Date: Aug. 8, 2013

(65) Prior Publication Data
US 2014/0344491 A1 Nov. 20, 2014

(51) Int. Cl.
G06F 13/24 (2006.01)
G06F 9/48 (2006.01)
(52) U.S. Cl.
CPC ............. *G06F 13/24* (2013.01); *G06F 9/4812* (2013.01)
(58) Field of Classification Search
CPC ............................ G06F 13/24; G06F 9/4812
USPC ....................................... 710/262
See application file for complete search history.

(56) References Cited

U.S. PATENT DOCUMENTS

| 5,943,506 A * | 8/1999 | Poisner ................. G06F 13/105 341/22 |
| 6,205,560 B1 | 3/2001 | Hervin et al. |
| 6,343,338 B1 | 1/2002 | Reneris |
| 6,591,362 B1 | 7/2003 | Li |
| 6,823,464 B2 | 11/2004 | Cromer et al. |
| 6,968,410 B2 | 11/2005 | Bennett et al. |

(Continued)

FOREIGN PATENT DOCUMENTS

| CN | 1224917C A | 6/2001 |
| CN | 101141257 A | 3/2008 |

(Continued)

OTHER PUBLICATIONS

D.K. Becker, "Intel® DX4 Design for IBM 5x86C Microprocessors," Dec. 1, 1995, pp. 1-13, IBM Corporation, Available at: <datasheets.chipdb.org/IBM/x86/5x86/40042.pdf>.

(Continued)

*Primary Examiner* — Glenn A Auve
(74) *Attorney, Agent, or Firm* — HP Inc Patent Department

(57) ABSTRACT

Example embodiments disclosed herein relate to locking a system management interrupt (SMI) enable register of a chipset. Example embodiments include at least one contact configuration register to configure a contact of a chipset, and a contact SMI enable register of a chipset to store an enable value or a disable value. In example embodiments, the disable value stored in the contact SMI enable register is to prevent the chipset from providing an SMI request to a processor in response to an SMI signal received at the contact. Example embodiments further include locking the contact SMI enable register.

15 Claims, 4 Drawing Sheets

(56) References Cited

U.S. PATENT DOCUMENTS

| | | |
|---|---|---|
| 7,149,854 B2 | 12/2006 | Weber et al. |
| 7,248,597 B2 | 7/2007 | Kim |
| 7,797,473 B2 | 9/2010 | Rangarajan et al. |
| 2002/0120801 A1 | 8/2002 | Bennett et al. |
| 2003/0154392 A1 | 8/2003 | Lewis |
| 2007/0245054 A1 | 10/2007 | Wang et al. |
| 2008/0063183 A1 | 3/2008 | Greco et al. |
| 2009/0320128 A1 | 12/2009 | Pant et al. |
| 2010/0077199 A1 | 3/2010 | Hobson et al. |
| 2013/0290740 A1 | 10/2013 | Ziarnik et al. |

FOREIGN PATENT DOCUMENTS

| | | |
|---|---|---|
| CN | 101702433 A | 5/2010 |
| EP | 0575171 | 12/1993 |
| WO | WO-99/569217 A1 | 11/1999 |

OTHER PUBLICATIONS

International Search Report and Written Opinion, International Application No. PCT/US2012/023225, Date of Mailing: Oct. 10, 2012, pp. 1-7.

IBM Corporation, "IBM 5x86C Microprocessor BIOS Writer's Guide," Sep. 27, 1995, <http://datasheets.chipdb.org/IBM/x86/5x86/40038.PDF>.

Intel Corporation, "Intel® 5 Series Chipset and Intel® 3400 Series Chipset," Datasheet, excerpts, Jun. 2010, <http://www.intel.com/content/dam/doc/datasheet/5-chipset-3400-chipset-datasheet.pdf>, pp. 1-2, 462, 520, and 535.

Intel Corporation, "Intel® 5 Series Chipset and Intel® 3400 Series Chipset," Datasheet, Jun. 2010, <http://www.intel.com/content/dam/doc/datasheet/5-chipset-3400-chipset-datasheet.pdf>.

Loic Duflot "Security Issues Related to Pentium System Management Mode," available Dec. 16, 2011, <http://www.ssi.gouv.fr/archive/fr/sciences/fichiers/lti/cansecwest2006-duflot.pdf>.

National Semiconductor, "128-Pin LPC SuperI/O with Protection and Extensive GPIO Support," PC87360, Jul. 2000, Rev. 2.0, <http://www.datasheetcatalog.org/datasheet/nationalsemiconductor/PC87360.pdf>.

Red Hat, Inc., "System management interrupts," Apr. 21, 2011, Red Hat Enterprise MRG 1.3, Realtime Reference Guide, section 3.4, <http://web.archive.org/web/20110421074457/http://docs.redhat.com/docs/en-US/Red_Hat_Enterprise_MRG/1.3/html/Realtime_Reference_Guide/sect-Realtime_Reference_Guide-Hardware_interrupts-System_management_interrupts.html>.

Wikipedia, "Chipset," Dec. 25, 2011, <https://en.wikipedia.org/w/index.php?title=Chipset&oldid=467635771>.

Wikipedia, "Super I_O," Sep. 1, 2011, <http://en.wikipedia.org/w/index.php?title=Super_I/O&oldid=447808476>.

Wikipedia, "System Management Mode," Aug. 8, 2011, <https://en.wikipedia.org/w/index.php?title=System_Management_Mode&oldid=443674736>.

\* cited by examiner

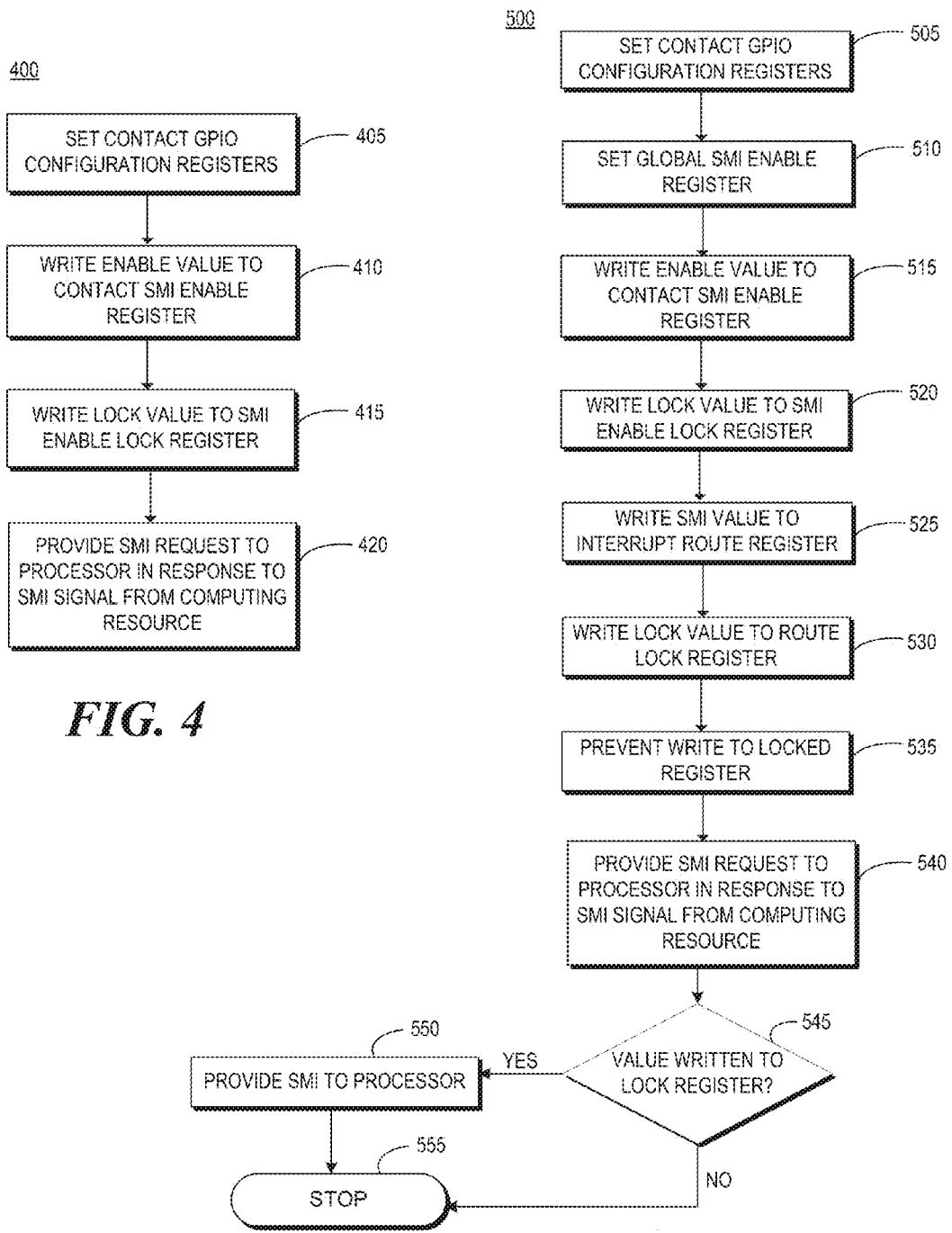

LOCKING A SYSTEM MANAGEMENT INTERRUPT (SMI) ENABLE REGISTER OF A CHIPSET

BACKGROUND

A computing device, such as a desktop computer, notebook computer, or the like, may include a number of electronic components in communication with a processor of the computing device. In some examples, the electronic components may be able to cause an interrupt, such as a system management interrupt (SMI), at the processor. In response, the processor may enter a processing mode associated with the interrupt to perform functionalities for handling the interrupt.

BRIEF DESCRIPTION OF THE DRAWINGS

The following detailed description references the drawings, wherein:

FIG. 4 is a flowchart of an example method for locking an SMI enable register of a chipset; and FIG. 5 is a flowchart of an example method for preventing a write operation to an SMI enable register of a chipset.

DETAILED DESCRIPTION

Figure 1:
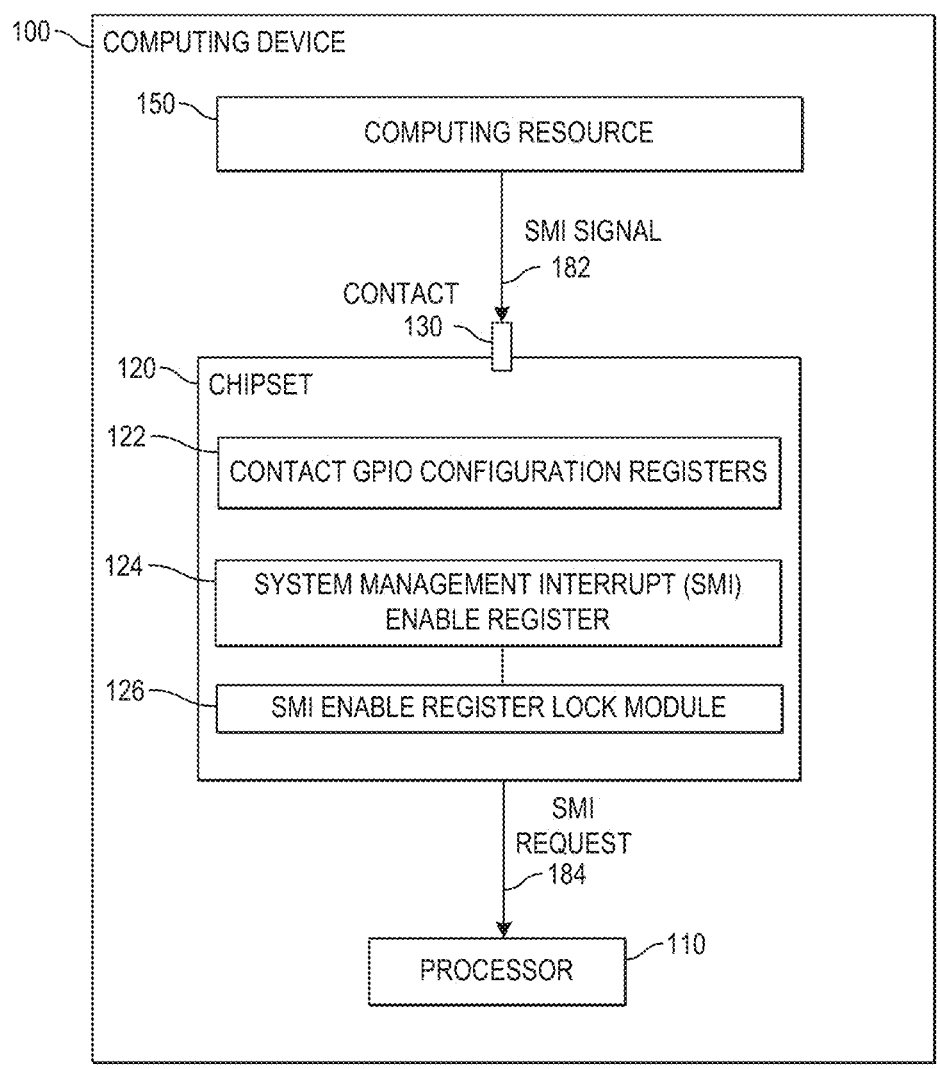
FIG. 1 is a block diagram of an example computing device to lock a system management interrupt (SMI) enable register of a chipset.

As noted above, components of a computing device may cause interrupts at a processor of the computing device. For example, a computing resource, such as an input/output (I/O) controller, may cause a system management interrupt (SMI) at the processor by providing an SMI signal to a designated contact of a chipset in communication with the processor. In such examples, the chipset may provide an SMI request to the processor in response to receiving the SMI signal from the computing resource at the designated contact.

In some examples, the chipset may include an SMI enable register corresponding to the designated contact. In such examples, the chipset may provide the SMI request to the processor in response to the SMI signal when an enable value is stored in the SMI enable register, and not when a disable value is stored in the SMI enable register. As such, changing a value stored at the SMI enable register from the enable value to the disable value may prevent the computing resource from being able to cause an SMI at the processor by breaking an SMI communication path from the computing resource to the processor.

In such examples, allowing such an SMI communication path to be broken may lead to security vulnerabilities in computing devices in which SMIs are used for computing device security. For example, a computing resource, such as a super I/O, may include a plurality of registers used to configure aspects of the operation of the computing device, such as power settings, error codes, temperature control, and/or other system management settings. In such examples, these super I/O registers may be password protected to restrict access to these registers. For example, knowledge of the password may be restricted to the basic input/output system (BIOS) to prevent access to the super I/O registers by executable instructions other than the BIOS (e.g., malicious software).

However, the password protection of the super I/O registers may still be vulnerable to a dictionary attack. Accordingly, in some examples, the super I/O may cause an SMI at the processor in response to the entry of any password to ensure that the password was entered by the BIOS. However, in such examples, these protections of the super I/O registers may be defeated by storing a disable value in the appropriate SMI enable register, and thereby breaking the SMI communication path between the super I/O and the processor. For example, by breaking the SMI communication path, malicious software may perform a dictionary attack at the super I/O without the super I/O being able to cause an SMI at the processor.

To address these issues, examples described herein provide the ability to lock SMI enable registers of the chipset. In this manner, examples described herein may secure an SMI communication path from a computing resource to a processor of a computing device so that security provided by SMIs originating at the computing resource may not be readily defeated by changing a value in an SMI enable register of the chipset.

Referring now to the drawings, FIG. 1 is a block diagram of an example computing device 100 to lock a system management interrupt (SMI) enable register of a chipset. As used herein, a "computing device" is a desktop computer, a notebook computer, an all-in-one computer, a slate or tablet computer, a handheld computer, a mobile phone, a smart device (e.g., a smartphone), a server, or any other device having a processor capable of handling interrupts. In the example of FIG. 1, computing device 100 includes a processor 110, a chipset 120, and a computing resource 150.

As used herein, a "processor" may be at least one central processing unit (CPU), at least one semiconductor-based microprocessor, at least one graphics processing unit (GPU), at least one other hardware device suitable for the retrieval and execution of instructions stored on a machine-readable storage medium, or a combination thereof. Additionally, as used herein, a "chipset" may be at least one hardware device including electronic circuitry to at least provide communication between a processor and a separate computing resource of a computing device. A chipset may be, for example, a southbridge, a peripheral control hub (PCH), or the like, or a combination thereof.

In examples described herein, a processor and a chipset may be provided on separate chips and/or in separate packages. In other examples, a processor and a chipset may be provided as part of the same package and/or chip, while maintaining a physical separation between the hardware implementing the processor and the hardware implementing the chipset. For example, hardware implementing a processor may be physically separate from hardware implementing a chipset on the same chip with the processor and chipset hardware being connected by at least one bus. In some examples, the processor and the chipset may be provided as components of a system-on-chip.

As used herein, a "computing resource" may be any hardware device of a computing device that includes electronic circuitry and is physically separate from a processor and a chipset of the computing device. For example, a computing resource may be an I/O controller, such as a super I/O, an application-specific integrated circuit (ASIC), and embedded controller (EC), a fan controller, or the like, or a combination thereof. In the example of FIG. 1, computing resource 150 may generate an SMI signal 182 to cause an SMI at processor 110. In examples described herein, an SMI signal may be a signal generated by a computing resource of a computing device in response to a determination of the computing resource to cause an SMI at a processor of the computing device, wherein the signal is output to cause the desired SMI at the processor. Computing device 150 may cause the SMI by providing the SMI signal 182 to a contact at chipset 120 (e.g., contact 130) configured to receive SMI signals 182.

In some examples, computing resource 150 may be a super I/O and may generate SMI signal 182 to cause an SMI at processor 110 when a password is entered at the super I/O to gain access to registers of the super I/O. Additionally, or alternatively, the super I/O may generate the SMI signal 182 for any other reason when an SMI at processor 110 is desired by the super I/O. For example, the super I/O may generate SMI signal 182 to cause computing device 100 to transition to a sleep state, or upon detection of the opening of a case of computing device 100.

In other examples, computing resource 150 may be any ASIC of computing device 100 that generates SMI signal 182 to cause an SMI at processor 110. Computing resource 150 may be a fan controller and may generate SMI signal 182 to provide a warning signal when parameters, such as fan speed or a system temperature, are outside of acceptable limits for computing device 100. In other examples, the fan controller may be part of a super I/O and the super I/O may generate SMI signals 182 if the parameters are outside of the acceptable limits.

In the example of FIG. 1, chipset 120 may include a contact 130. In other examples, chipset 120 may include additional contacts. As used herein, a "contact" may be a conductive pin, a conductive ball, any other conductive element for conveying an electrical signal from outside a package of the chipset to electronic circuitry inside of the package, or a combination thereof. Chipset 120 may also include at least one contact configuration register 122 associated with contact 130, a contact SMI enable register 124 associated with contact 130, and an SMI enable register lock module 126. In some examples, the functionalities of module 126 may be implemented in the form of executable instructions encoded on a machine-readable storage medium, in the form of electronic circuitry, or a combination thereof.

Registers 122 may collectively configure contact 130 as a general purpose input/output (GPIO) to receive input. For example, registers 122 may collectively configure contact 130 as a GPIO to receive input if appropriate information is stored in each of registers 122. In such examples, registers 122 may be used to configure contact 130 differently by storing different information in at least one of registers 122. Registers 122 may include, for example, a first register to selectively configure contact 130 as a GPIO, and a second register to selectively configure contact 130 to receive input. Registers 122 may further include a third register to specify that contact 130 is active at a high logic level or active at a low logic level. In other examples, registers 122 may include other registers for configuring other aspects, uses, or functionalities of contact 130, or a combination thereof. In some examples, if registers 122 are set to collectively configure contact 130 as a GPIO to receive input (e.g., by appropriate information stored therein), contact 130 may receive SMI signal 182 generated by computing resource 150.

In the example of FIG. 1, chipset 120 further comprises a contact SMI enable register 124. In examples described herein, an SMI enable register may be a register that may be used, alone or in combination with other information stored on the chipset, to enable the chipset to provide SMI requests to a processor in response to at least some SMI signals received by the chipset. In such examples, an SMI enable register may also be used to prevent the chipset from providing SMI requests to the processor in response to at least some SMI signals received by the chipset.

As used herein, a "contact SMI enable register" of a chipset may be an SMI enable register of the chipset associated with a specific contact of the chipset. For example, contact SMI enable register 124 is associated with contact 130 of chipset 120. As used herein, a chipset register that is "associated with" a contact of the chipset may be a register that affects the operation of the chipset in relation to the contact. For example, contact SMI enable register 124 may affect the operation of chipset 120 in relation to signals received at contact 130. In such examples, contact SMI enable register 124 may affect the operation of chipset 120 in relation to signals received at a single contact exclusively, namely contact 130. In such examples, contact SMI enable register 124 associated with contact 130 may not affect the operation of chipset 120 with regard to any other contact.

In some examples, an enable value or a disable value may be stored in contact SMI enable register 124. In examples described herein, the enable value may be any information, such as a data value, bit pattern, etc., and the disable value may be any information different than the enable value. For example, the enable value may be a "1" while the disable value is a "0", or vice versa.

In the example of FIG. 1, an enable value stored in the contact SMI enable register 124 may, in combination with other chipset information, enable chipset 120 to provide an SMI request 184 to processor 100 in response to SMI signal 182 received from computing resource 150 via contact 130. As used herein, "chipset information" may be values stored in registers of a chipset. In the example of FIG. 1, the other chipset information may include, for example, a value stored in a global SMI enable register of chipset 120 and a value stored in an interrupt route register of chipset 120 associated with contact 130. In other examples, further chipset information used in combination with the enable value may be stored in other registers of chipset 120.

In some examples, the value stored the global SMI enable register may indicate whether SMIs are enabled globally for chipset 120 (i.e., across all contact), and the value stored in the interrupt route register may indicate that signals received at contact 130 are to be routed as SMI requests to processor 110. In such examples, the enable value stored in contact SMI enable register, in combination with the information indicating that SMIs are enabled globally and that signals received at contact 130 are to be routed as SMI requests, may enable chipset 120 to provide SMI request 184 to processor 100 in response to SMI signal 182 received from computing resource 150 via contact 130. In some examples, contact 130 may be configured to receive SMI signals if the registers 122 are set to configure contact 130 as a GPIO to receive input, and register 124 is set to an enable value.

In the example of FIG. 1, a disable value stored in SMI enable register 124 may prevent the chipset from providing any SMI request 184 to processor 110 in response to the SMI signal 182 received from computing resource 150 via a contact 130. As used herein, an "SMI request" may be an instruction, a request, an interrupt signal, or any other information that, when provided to a processor, indicates a system management interrupt (SMI) to the processor, causes an SMI at the processor, and/or in response to which the processor will invoke an interrupt handler associated with the SMI.

Additionally, chipset 120 may lock contact SMI enable register 124. Chipset 120 may include an SMI enable register lock module 126. In some examples, contact SMI enable register 124 may be a write-once register. In examples described herein, a write-once register may be a register that may be written only once after a reset of a computing device comprising the register. If register 124 is a write-once register, module 126 may lock register 124 by writing a value to register 124 after a reset of computing device 100 before any other write to register 124. For example, module 126 may lock register 124 by writing the enable value to register 124 after a reset. In such examples, no component, instructions, etc., may write a disable value to register 124 before a reset of computing device 100. In other examples, module 126 may lock register 124 by writing the disable value to register 124 after a reset.

In other examples, module 126 may include an SMI enable lock register associated with contact SMI enable register 124. In such examples, chipset 120 may write to register 124 if the SMI enable lock register stores an unlock value, and may not write to register 124 if the SMI enable lock register stores a lock value. If module 126 includes the SMI enable lock register, module 126 may lock register 124 by writing the lock value to the SMI enable lock register.

Examples described herein may allow a chipset to lock a contact SMI enable register of the chipset. In this manner, the chipset may protect against malicious software (e.g., machine readable instructions) breaking an SMI communication path from a computing resource to a processor to prevent the computing resource from causing an SMI at the processor. As noted above, some computing resources may rely on causing SMIs to provide security. Accordingly, examples described herein may increase computing device security by protecting the ability of computing resources to cause SMIs at a processor.

Also, as noted above, computing resources may use SMIs for other purposes as well, such as providing warning signals, causing a computing device to enter a sleep state, etc. By locking a contact SMI enable register, examples described herein may help ensure that such warning signals are not blocked, and help ensure that a computing device may enter a sleep state appropriately. Additionally, causing an SMI at a processor without having an appropriate interrupt handler ready to handle the SMI may cause a computing device including the processor to lock (e.g., freeze, cease execution, etc.). In such examples, a denial-of-service attack may be accomplished by causing inappropriate SMIs. However, examples described herein may prevent such attacks by locking contact SMI enable registers set to a disable value, such that malicious software (e.g., computer readable instructions) may not write enable values to these registers and then cause inappropriate SMIs at a processor.

Figure 2:
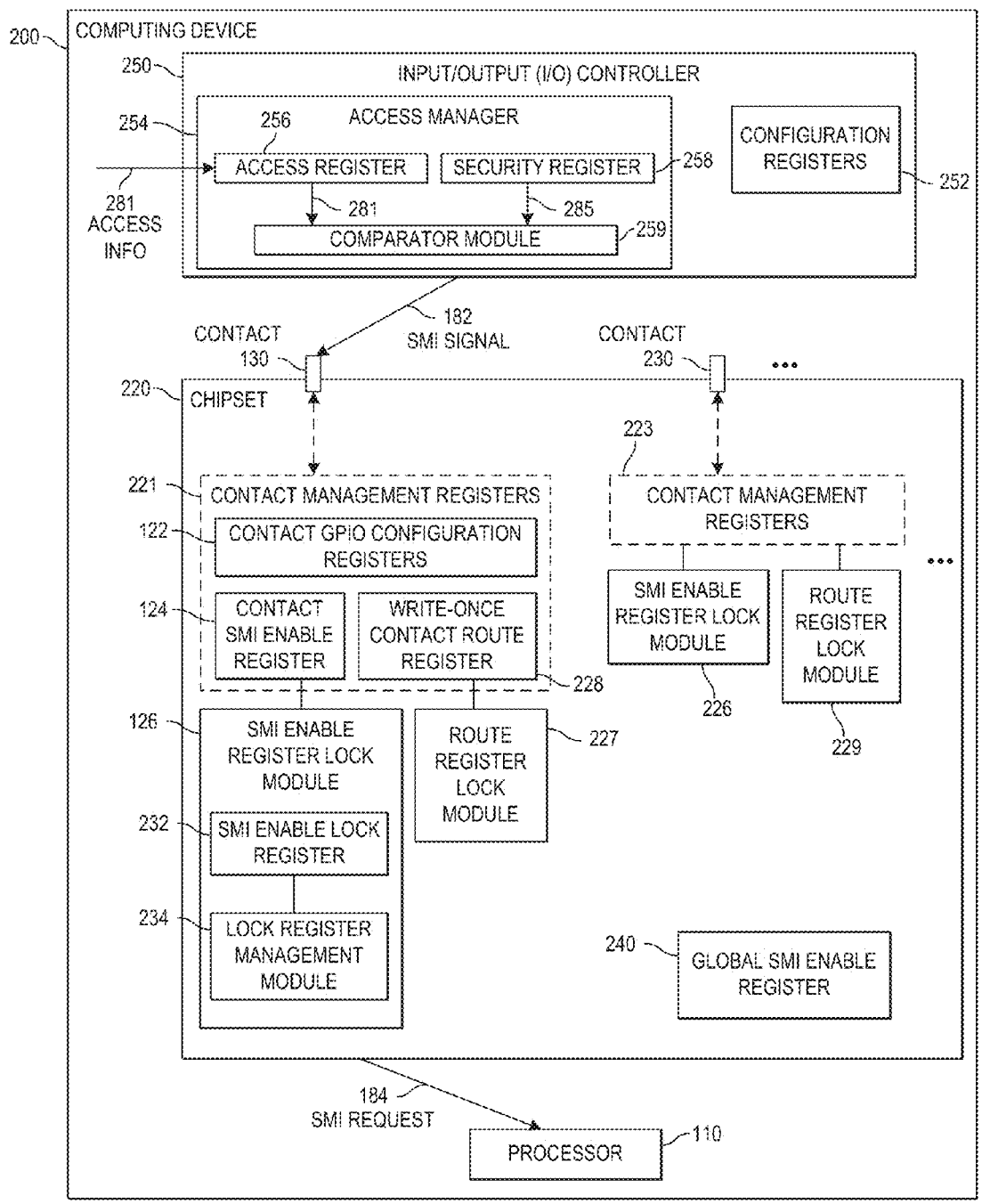
FIG. 2 is a block diagram of an example computing device to lock an SMI enable register and a route register of the chipset.

FIG. 2 is a block diagram of an example computing device 200 to lock an SMI enable register and a route register of the chipset. In the example of FIG. 2, computing device 200 includes a processor 100, as described above in relation to FIG. 1. Computing device 200 further comprises a chipset 220 and an I/O controller 250. In the example of FIG. 2, chipset 220 may include contact 130, contact configurations registers 122, contact SMI enable register 124, and SMI enable register lock module 126, as described above in relation to FIG. 1. In the example of FIG. 2, chipset 220 also includes a contact 230. In other examples, chipset 200 may include additional contacts. Chipset 220 may also include contact management registers 221, which include registers 122 and 124 associated with contact 130, as described above in relation to FIG. 1.

In the example of FIG. 2, module 126 includes an SMI enable lock register 232 and a lock register management module 234. If module 126 includes SMI enable lock register 232, module 234 may lock contact SMI enable register 124 by writing a lock value to SMI enable lock register 232. In such examples, chipset 220 may write to register 124 if register 232 stores an unlock value, and may not write to register 124 if register 232 stores a lock value. In examples described herein, the lock value may be any information, such as a data value, bit pattern, etc., and the unlock value may be any information different than the lock value. For example, the lock value may be a "1" while the unlock value is a "0", or vice versa. In some examples, SMI enable lock register 232 may be a write-once register. In such examples, to lock register 124, module 234 may write a lock value to register 232 after a reset of computing device 200 before any other write to register 232. In such examples, after the lock value is written to register 232, any subsequent write operation (e.g., of an unlock or a lock value) to register 232 before the next reset of computing device 200 will have no effect.

In the example of FIG. 2, chipset 220 also includes a global SMI enable register 240. In some examples, the global SMI enable register is not associated with any one contact of chipset 220. Rather, a global disable value stored in register 240 may prevent chipset 220 from providing any SMI request 184 to processor 110 regardless of any SMI signal received at any contact of chipset 220, and regardless of the values stored at any contact SMI enable registers.

Additionally, a global enable value stored in register 240 may, in combination with other chipset information, enable chipset 120 to provide an SMI request 184 to processor 100 in response to an SMI signal 182 received from computing resource 150 via a contact of chipset 220. For example, a global enable value stored in register 240 may enable chipset 120 to provide an SMI request 184 to processor 100 in response to an SMI signal 182 received at contact 130 if each of registers 122, 124 and 228 is storing an appropriate value to enable chipset 220 to provide SMI request 184 in response to SMI signal 182.

In the example of FIG. 2, contact management registers 221 also include a contact interrupt route register 228 associated with contact 130. In examples described herein, an interrupt route register may be a register that indicates a type of interrupt request (including no interrupt request) that the chipset may provide to a processor in response to an interrupt signal received at the chipset.

As used herein, a "contact interrupt route register" of a chipset may be an interrupt route register of the chipset associated with a specific contact of the chipset. For example, contact interrupt route register 228 is associated with contact 130 of chipset 220. In such examples, route register 228 may indicate a type of interrupt request that chipset 220 may provide to processor 110 in response to SMI signal 182 received from I/O controller 250 at contact 130. In such examples, route register 228 associated with contact 130 may not affect the operation of chipset 120 with regard to any other contact.

In some examples, values that may be stored at register 228 may include an SMI value, a "no interrupt" value, and at least one other interrupt value. These values may be any type of information as long as the information is different for each of the values described above. In the example of FIG. 2, an SMI value stored at register 228 may indicate that chipset 220 may provide an SMI request to processor 110 in response to an SMI signal 182 from I/O controller 250 received via contact 130. An enable value stored in register 124 and an SMI value stored in register 228 may, alone or in combination with other chipset information, enable chipset 220 to provide SMI request 184 to processor 110 in response to SMI signal 182 received from a computing resource (e.g., I/O controller 250) via contact 130. In such examples, the ability of chipset 220 to output SMI request 184 may also depend upon, for example, a value stored in a global SMI enable register 240 of chipset 220.

Additionally, a value other than the SMI value stored in contact interrupt route register 228 may prevent chipset 220 from providing SMI request 184 to processor 110 in response to SMI signal 182 received at contact 130. For example, the "no interrupt" value, or any value indicating a interrupt of a type other than an SMI (e.g., a non-maskable interrupt (NMI)), may prevent chipset 220 from providing SMI request 184 to processor 110 in response to SMI signal 182 received at contact 130.

Chipset 220 may further include a route register lock module 227 to lock register 228. In some examples, register 228 may be a write-once register and module 227 may lock register 228 by writing a value to register 228 after a reset of computing device 220 before any other write to register 228. For example, module 227 may lock register 228 by writing the SMI value to register 228 after a reset. In other examples, module 227 may lock register 228 by writing another value (e.g., the "no interrupt" value) to register 228 after a reset. In other examples, register 228 may not be a write-once register. In such examples, module 227 may include a lock register and management module and lock register 228 as described above in relation to lock register 232 and module 234.

In the example of FIG. 2, chipset 220 comprises a plurality of contacts, including at least contacts 130 and 230. In such examples, chipset 220 may include a respective set of contact management registers, as described herein in relation to registers 221, associated with each of the plurality of contacts. For example, chipset 220 may include a set of contact management registers 221 associated with contact 130, and a set of contact management registers 223 associated with contact 230. Chipset 220 may also include additional sets of contact management registers for additional contacts of the plurality. In such examples, each set of contact management registers associated with one of the plurality of contacts (e.g., registers 223 associated with contact 230) may include contact configuration registers, a contact SMI enable register, and a contact interrupt route register, as described herein in relation to registers 122, 124, and 228, respectively.

In such examples, chipset 220 may include a respective contact SMI enable register, as described herein in relation to register 124, associated with each of the plurality of contacts. Additionally, in some examples, chipset 220 may also include a respective contact interrupt route register, as described herein in relation to register 228, associated with each of the plurality of contacts.

Chipset 220 may lock each of the plurality of contact SMI enable registers in any manner described herein in relation to module 126. For example, chipset 220 may include an SMI enable register lock module 226 that may lock a contact SMI enable register associated with contact 230 in any manner described herein in relation to module 126. Additionally, chipset 220 may lock each of the plurality of contact interrupt route registers in any manner described herein in relation to module 227. For example, chipset 220 may include a route register lock module 229 that may lock a contact interrupt route register associated with contact 230 in any manner described herein in relation to module 227.

Chipset 220 may also include at least one additional contact having no associated contact management registers or corresponding lock modules.

In the example of FIG. 2, I/O controller 250 may include a plurality of configuration registers 252 and an access manager 254. Configuration registers 252 may include registers used to configure aspects of the operation of computing device 200. For example, registers 252 may be used to control settings of computing device 200, such as power settings (e.g., a maximum allowable voltage on a voltage rail, etc.), error codes, temperature settings (e.g., maximum allowable temperatures, fan speeds, etc.), and the like.

In some examples, it may be beneficial to prevent modification of these settings by malicious software (e.g., executable instructions). However, it may be disadvantageous to lock these settings such that they cannot be changed. For example, it may be beneficial to allow trusted systems of computing device 200 (e.g., the basic input/output system (BIOS)) to alter these settings during runtime. As such, in some examples, access manager 254 may grant access to configuration registers 252 if it receives valid access information. In such examples, the valid access information may be known exclusively by the trusted systems (e.g., BIOS).

In the example of FIG. 2, access manager 254 may receive access information 281. For example, access information 281 may be received from instructions executing on processor 110, such as instructions of the BIOS of computing device 200. Access manager 254 may grant access to configuration registers 252 if the received access information is equivalent to security information stored in access manager 254. For example, access information 281 may be received at an access register 256 of access manager 254. In response to receiving access information 281 at access register 256 of access manager 254, I/O controller 250 may provide an SMI signal 182 to chipset 200 (e.g., at contact 130) to cause an SMI at processor 110. In some examples, the SMI caused by access manager 254 may be used to ensure that access information 281 was provided to access manager 254 by the BIOS of computing device 200, for example.

Security register 258 may be a write-only register storing security information that is equivalent to the correct (or valid) access information. Comparator module 259 may compare security information 285 received from security register 258 to access information 281 received from access register 256. In the example of FIG. 2, comparator module 259 may grant access to configuration registers 252 if module 259 determines that the received access information 281 is equivalent to the security information 285. For example, module 259 may clear a lock bit, or the like.

As noted above, the SMI caused by access manager 254 may be used, for example, to ensure that access information 281 was provided to access manager 254 by the BIOS of computing device 200. For example, the SMI may cause processor 110 to invoke an SMI handler (e.g., executable instructions). In some examples, the SMI handler may clear the access register 256. In such examples, if the BIOS provided the access information, then computing device 200 may be operating in system management mode (SMM), in which case BIOS may complete it's register update operation prior to the SMI handler being invoked. However, if non-BIOS instructions provide access information 281, then the SMI handler will clear the access register 256 before the non-BIOS instructions have the opportunity to change any information in configuration registers 252, even if the non-BIOS instructions provide the correct access information 281. In this manner, computing device 200 may ensure that only BIOS may access the configuration registers and reduce the likelihood of a dictionary attack on access manager 254. However, the security provided by the SMI caused by access manager 254 may be disabled if the non-BIOS instructions write a disable value to contact SMI enable register 124, since, in that case, chipset 220 will not provide SMI request 184 to processor 110 in response to SMI signal 182 at contact 130. As such, examples described herein lock contact SMI enable registers to secure the SMI communication path from a computing resource (e.g., I/O controller 250) to a processor of a computing device.

In some examples, the functionalities of modules 226, 227, 229, 259, and any other modules of computing device 200 may be implemented in the form of executable instructions encoded on a machine-readable storage medium, in the form of electronic circuitry, or a combination thereof. In the example of FIG. 2, I/O controller 250 may be a super I/O. In other examples, computing device 200 may include any other computing resource instead of I/O controller 250. In such examples, the computing resource may provide SMI signal 182 to chipset 220. Additionally, in some examples, functionalities and/or components described herein in relation to FIGS. 1-2 may be provided in combination with functionalities and/or components described herein in relation to any of FIGS. 3-5.

Figure 3:
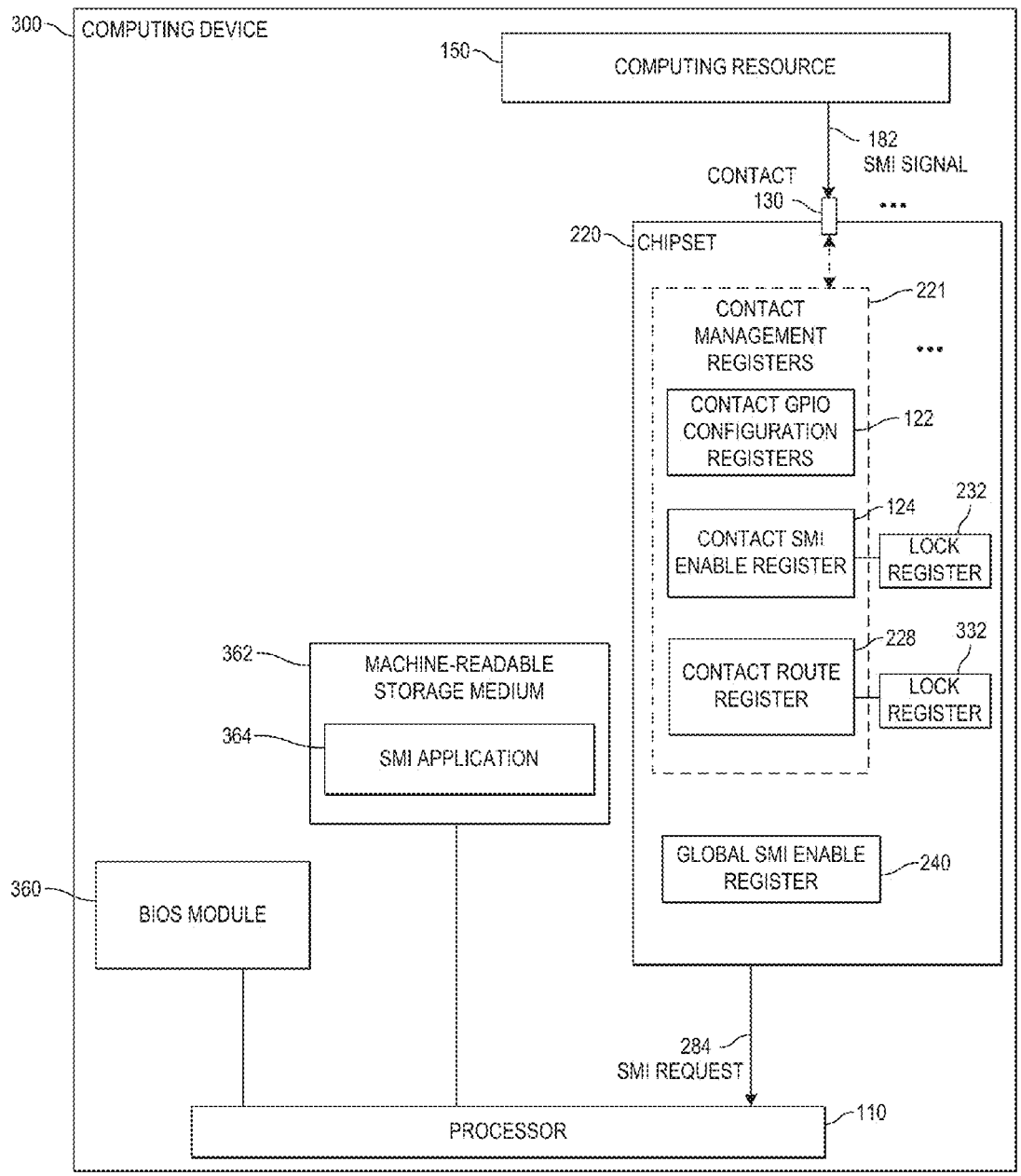
FIG. 3 is a block diagram of another example computing device to lock an SMI enable register of a chipset.

FIG. 3 is a block diagram of another example computing device 300 to lock an SMI enable register of a chipset. In the example of FIG. 3, computing device 300 may include a processor 110 and a computing resource 150, as described above in relation to FIG. 1. Computing device 300 may also include a chipset 220 as described above in relation to FIG. 2. In some examples, computing device 300 may also include a BIOS module 360 and a machine-readable storage medium 362 including an SMI application 364. BIOS module 360 may store instructions implementing the BIOS of computing device 300. In the example of FIG. 3, storage medium 362 is separate from BIOS module 360. In other examples, BIOS module 360 may comprise storage medium 362 and include the instructions implementing the BIOS of computing device 300 in addition to SMI application 364.

In examples described herein, a "BIOS module" may be a module including a series of instructions encoded on a machine-readable storage medium for implementing at least BIOS functionalities for a computing device. As used herein, a "machine-readable storage medium" may be any electronic, magnetic, optical, or other physical storage device that contains, stores, or is otherwise encoded with executable instructions. For example, any machine-readable storage medium described herein may be any of Random Access Memory (RAM), flash memory, a storage drive (e.g. a hard disk), a Compact Disc Read Only Memory (CD-ROM), and the like, or a combination thereof. Further, any machine-readable storage medium described herein may be non-transitory.

In some examples, the functionalities of SMI application 364 may be implemented in the form of executable instructions encoded on a machine readable storage medium, in the form of electronic circuitry, or a combination thereof. In the example of FIG. 3, the functionalities of SMI application 364 may be implemented in the form of executable instructions encoded on a machine readable storage medium (e.g., storage medium 362). In such examples, processor 110 may fetch, decode, and execute the instructions of SMI application 364 stored on machine-readable storage medium 362 to implement the functionalities described below in relation to SMI application 364. In other examples, the functionalities of SMI application 364 may be implemented in the form of electronic circuitry or a combination electronic circuitry and executable instructions. For example, the functionalities of SMI application 364 may be implemented by logic of computing device 300 (e.g., electronic circuitry) independent of a processor.

In the example of FIG. 3, SMI application 364 may set at least one contact configuration register to configure a contact of chipset 220 as a GPIO to receive an SMI signal 182 from computing resource 150. For example, SMI application 364 may set a plurality of registers 122, described above in relation to FIG. 1, and associated with contact 130, to configure contact 130 as a GPIO to receive an SMI signal 182 from computing resource 150. SMI application 364 may also set at least one contact SMI enable register of chipset 220 to an enable value. For example, SMI application 364 may set a contact SMI enable register 124, as described above in relation to FIG. 1, and associated with contact 130 to an enable value. Additionally, SMI application 364 may set a contact interrupt route register associated with a contact of chipset 220 to an SMI value. For example, SMI application 364 may set a contact interrupt route register 228, as described above in relation to FIG. 2, and associated with contact 130, to an SMI value.

In some examples, SMI application 364 may lock each register of chipset 220 in an SMI path of a contact of chipset 220. For example, SMI application 364 may lock each register of chipset 220 in an SMI path of contact 130. In examples described herein, an SMI path of a contact of a chipset may include a plurality of chipset registers any one of which may prevent the chipset from providing an SMI request to a processor in response to an SMI signal received at the contact. Registers in an SMI path for a contact may include, for example, a contact SMI enable register and a contact interrupt route register associated with the contact. In other examples, SMI application 364 may lock at least one register in the SMI path of a contact. In some examples, SMI application 364 may lock a contact SMI enable register, set to the enable value, such that the BIOS module is to control alteration of the enable value stored in the contact SMI enable register. For example, SMI application 364 may lock register 124 after writing an enable value to register 124.

For example, SMI application 364 may lock register 124 such that BIOS may control alteration of the enable value stored in register 124. For example, chipset 220 may provide a lock register 232 associated with register 124, as described above in relation to FIG. 2, and chipset 220 may provide an SMI request 284 to processor 110 in response to an operation to write a value (e.g., an unlock value) to lock register 232. In such examples, BIOS may allow the write operation if performed by BIOS, and disallow the write if non-BIOS instructions attempted the write operation. In some examples, SMI application 364 may write a lock value to lock register 232 in order to lock register 124.

In the example of FIG. 3, SMI application 364 may also lock a contact interrupt route register, set to the SMI value, such that the BIOS module is to control alteration of the SMI value stored in the contact interrupt route register. For example, SMI application 364 may lock register 228 after writing the SMI value to register 228. In some examples, SMI application 364 may lock register 228 such that BIOS may control alteration of the SMI value stored in register 228. For example, chipset 220 may provide a lock register 332 associated with register 124, and chipset 220 may provide an SMI request 284 to processor 110 in response to an attempt to write to lock register 332. In such examples, BIOS may allow a write operation if performed by BIOS, and disallow the write if non-BIOS instructions attempted the write operation. In some examples, SMI application 364 may write a lock value to lock register 332 in order to lock register 228. SMI application 364 may also set a global SMI register of chipset 220. For example, SMI application 364 may set a global SMI enable register 240 to a global enable value, as described above in relation to FIG. 2.

In some examples, BIOS module 360 may comprise storage medium 362, which includes SMI application 364. In such examples, instructions of SMI application 364 may be part of the BIOS of computing device 300. In some examples, the BIOS may include instructions for performing a power-on self test (POST). In such examples, at least some of the instructions described above in relation to SMI application 364 may be executed as part of the POST. For example, the instructions for performing the POST may include the instructions of SMI application 364. In some examples, functionalities and/or components described herein in relation to FIG. 3 may be provided in combination with functionalities and/or components described herein in relation to any of FIGS. 1-2 and 4-5.

FIG. 4 is a flowchart of an example method 400 for locking an SMI enable register of a chipset. Although execution of method 400 is described below with reference to computing device 100 of FIG. 1, other suitable components for execution of method 400 can be utilized (e.g., computing device 200 or 300). Additionally, method 400 may be implemented in the form of executable instructions encoded on a machine-readable storage medium, in the form of electronic circuitry, or a combination thereof.

At 405 of method 400, at least one contact configuration register 122 of chipset 120 may be set to configure a contact 130 of the chipset as a GPIO to receive input. At 410, an enable value may be written to a contact SMI enable register 124 of chipset 120. At 415, a lock value may be written to an SMI enable lock register of module 126 to lock register 124. In some examples, registers 122, register 124, and/or the lock register may be written by chipset 120 in response to instructions executed by processor 110.

At 420, chipset 120 may provide an SMI request 184 to processor 100 in response to receiving an SMI signal 182 from computing resource 150 at contact 130, based at least in part on the enable value being stored in the contact SMI enable register. In some examples, the SMI request 184 may be provided in response to the SMI signal 182 if at least, for example, the enable value is stored in the contact SMI enable register, the SMI value is stored in a contact interrupt route register, and a global enable value is stored in a global SMI enable register. In such examples, chipset may not provide SMI request 184 in response to SMI signal 182 if the disable value is stored in register 124, for example.

FIG. 5 is a flowchart of an example method 500 for preventing a write operation to an SMI enable register of a chipset. Although execution of method 500 is described below with reference to computing device 200 of FIG. 2, other suitable components for execution of method 500 can be utilized (e.g., computing device 100 or 300). Additionally, method 500 may be implemented in the form of executable instructions encoded on a machine-readable storage medium, in the form of electronic circuitry, or a combination thereof.

At 505 of method 500, at least one contact configuration register 122 of chipset 220 may be set to configure a contact of the chipset as a GPIO to receive input. For example, registers 122 associated with contact 130 may be configured as a GPIO to receive input. At 510, a global SMI enable register 240 of chipset 220 may be set to a global enable value. At 515, an enable value may be written to a contact SMI enable register 124 of chipset 120. For example, the enable value may be written to a register 124 associated with contact 130. At 520, a lock value may be written to an SMI enable lock register 232 of module 126 to lock register 124. In some examples, registers 122, register 124, lock register 232, and/or register 240 may be written by chipset 220 in response to instructions executed by processor 110.

At 525 of method 500, an SMI value may be written to a contact interrupt route register of chipset 220. For example, the SMI value may be written to a register 228 associated with contact 130. At 530, a lock value may be written to a route lock register 232 of module 227 to lock register 228. In some examples, register 228, register 232, or both may be written by chipset 220 in response to instructions executed by processor 110. At 535 of method 500, chipset 220 may prevent any operation to write to contact SMI enable register 124 if the lock value is stored in the SMI enable lock register, and prevent any operation to write to contact interrupt route register 228 if the lock value is stored in the route lock register.

At 540 of method 500, chipset 220 may provide an SMI request 184 to processor 100 in response to receiving an SMI signal 182 from computing resource 250 at contact 130, based at least in part on the enable value being stored in the contact SMI enable register, as described above in relation to FIG. 4. At 545, chipset 220 may determine whether a value is written to either the lock register associated with contact SMI enable register 124 or the lock register associated with contact interrupt route register 228. If not, method 500 may proceed to 555, where method 500 may stop. However, if a value is written to either the SMI enable lock register or the route lock register, then method 500 may proceed to 550, where chipset 220 may provide an SMI request 184 to processor 110 so that processor may determine whether the write operation (e.g., a write operation to unlock the lock register) was made by the BIOS of computing device 200, for example. If so, then computing device 200 may allow the write operation. If not, then computing device 200 may prevent the write operation. Method 500 may then proceed to 555, where method 500 may stop.

What is claimed is:

1. A computing device comprising:
a processor;
a computing resource to generate a system management interrupt (SMI) signal; and
a chipset comprising:
a first contact to receive the SMI signal from the computing resource;
at least one contact configuration register to configure the first contact as a general purpose input/output (GPIO) to receive input; and
a first contact SMI enable register associated with the first contact, wherein an enable value stored in the first contact SMI enable register is to, in combination with other chipset information, enable the chipset to provide an SMI request to the processor in response to the received SMI signal;
wherein the chipset is to lock the first contact SMI enable register; and
wherein a disable value stored in the first SMI enable register is to prevent the chipset from providing an SMI request to the processor in response to the received SMI signal.

2. The computing device of claim 1, wherein:
the first contact SMI enable register is a write-once register; and the chipset is to write the enable value to the write-once register to lock the first contact SMI enable register.

3. The computing device of claim 1, wherein the chipset further comprises:
an SMI enable lock register, wherein the chipset is to write a lock value to the SMI enable lock register to lock the first contact SMI enable register; and
wherein the at least one contact configuration register is a plurality of contact configuration registers to collectively configure the first contact as a general purpose input/output (GPIO) to receive input.

4. The computing device of claim 1, wherein the chipset comprises:
a plurality of contacts, including the first contact and at least a second contact;
a global SMI enable register, wherein the other chipset information comprises a value stored in the global SMI enable register; and
a plurality of contact SMI enable registers associated with the plurality of contacts, respectively, the plurality of contact SMI enable registers including the first contact SMI enable register and at least a second contact SMI enable register;
wherein the chipset is to lock each of the plurality of contact SMI enable registers.

5. The computing device of claim 4, wherein the chipset further comprises:
a plurality of contact interrupt route registers associated with the plurality of contacts, respectively, wherein the other chipset information comprises a value stored in the contact interrupt route register associated with the first contact;
wherein, for each of the contact interrupt route registers, a value other than an SMI value stored in the contact interrupt route register is to prevent the chipset from providing an SMI request to the processor in response to an SMI signal received at the contact; and
wherein the chipset is to lock each of the contact interrupt route registers.

6. The computing device of claim 1, wherein the computing resource is an input/output (I/O) controller comprising:
a plurality of configuration registers;
an access manager to:
receive access information; and
grant access to the configuration registers if the received access information is equivalent to security information stored on the I/O controller;
wherein the I/O controller is to provide the SMI signal to the chipset in response to receiving the access information.

7. The computing device of claim 6, wherein the access manager comprises:
an access register to receive the access information, wherein the I/O controller is to provide the SMI signal to the chipset in response to receiving the access information at the access register;
a write-only security register to store the security information; and
a comparator to compare the access information received at the access register to the security information stored in the security register.

8. A non-transitory machine-readable storage medium comprising instructions that if executed cause a processor of a computing device to:
set at least one contact configuration register to configure a contact of a chipset of the computing device as a general purpose input/output (GPIO) to receive an SMI signal from a computing resource of the computing device;
set a contact system management interrupt (SMI) enable register of the chipset to an enable value, wherein the enable value stored in the contact SMI enable register is to, in combination with other chipset information, enable the chipset to provide an SMI request to the processor in response to receiving the SMI signal via the contact; and
lock the contact SMI enable register, set to the enable value, such that a BIOS module of the computing device is to control alteration of the enable value stored in the contact SMI enable register;
wherein a disable value stored in the contact SMI enable register is to prevent the chipset from providing an SMI request to the processor in response to the SMI signal received via the contact.

9. The storage medium of claim 8, further comprising instructions that if executed cause the processor to:
set a contact interrupt route register associated with the contact to an SMI value, wherein a value other than the SMI value stored in the contact interrupt route register is to prevent the chipset from providing an SMI request to the processor in response to an SMI signal received at the contact, wherein the other chipset information comprises a value stored in the contact interrupt route register; and
lock the contact interrupt route register set to the SMI value such that the BIOS module is to control alteration of the SMI value stored in the contact interrupt route register.

10. The storage medium of claim 9, further comprising instructions that if executed cause the processor to:
write a lock value to an SMI enable lock register associated with the contact SMI enable register to lock the contact SMI enable register; and
write a lock value to a route lock register associated with the interrupt route control register to lock the contact interrupt route register.

11. The storage medium of claim 9, further comprising instructions that if executed cause the processor to:
perform a power-on self-test (POST) including the setting of the contact SMI enable register, the locking of the contact SMI enable register, the setting of the contact interrupt route register, and the locking of the contact interrupt route register; and
set a global SMI enable register, wherein the other chipset information comprises a value stored in the global SMI enable register.

12. The storage medium of claim 8, comprising instructions that if executed cause the processor to:
lock each register of the chipset in an SMI path of the contact.

13. A method comprising:
setting at least one contact configuration register of a chipset of a computing device to configure a contact of the chipset as a general purpose input/output (GPIO) to receive input;
writing an enable value to a contact system management interrupt (SMI) enable register of the chipset, wherein a disable value stored in the contact SMI enable register is to prevent the chipset from providing an SMI request to the processor in response to the SMI signal;
writing a lock value to an SMI enable lock register to lock the contact SMI enable register; and providing an SMI request from the chipset to the processor in response to receiving the SMI signal from a computing resource of the computing device at the contact, based at least in part on the enable value being stored in the contact SMI enable register.

14. The method of claim 13, comprising:

preventing any operation to write to the contact SMI enable register if the lock value is stored in the SMI enable lock register;

writing an SMI value to a contact interrupt route register of the chipset, wherein a value other than the SMI value stored in the contact interrupt route register is to prevent the chipset from providing an SMI request to the processor in response to a signal of the specified logic level received at the contact;

writing a lock value to a route lock register associated with the contact interrupt route register; and preventing any write operation to the contact interrupt route register if the lock value is stored in the route lock register.

15. The method of claim 14, further comprising:

setting a global SMI enable register;

providing an SMI request to the processor if a value is written to the SMI enable lock register; and providing an SMI request to the processor if a value is written to the route lock register.

* * * * *